(No Model.) 2 Sheets—Sheet 1.
A. C. LEE.
DEVICE FOR RELEASING ANIMALS.
No. 352,547. Patented Nov. 16, 1886.
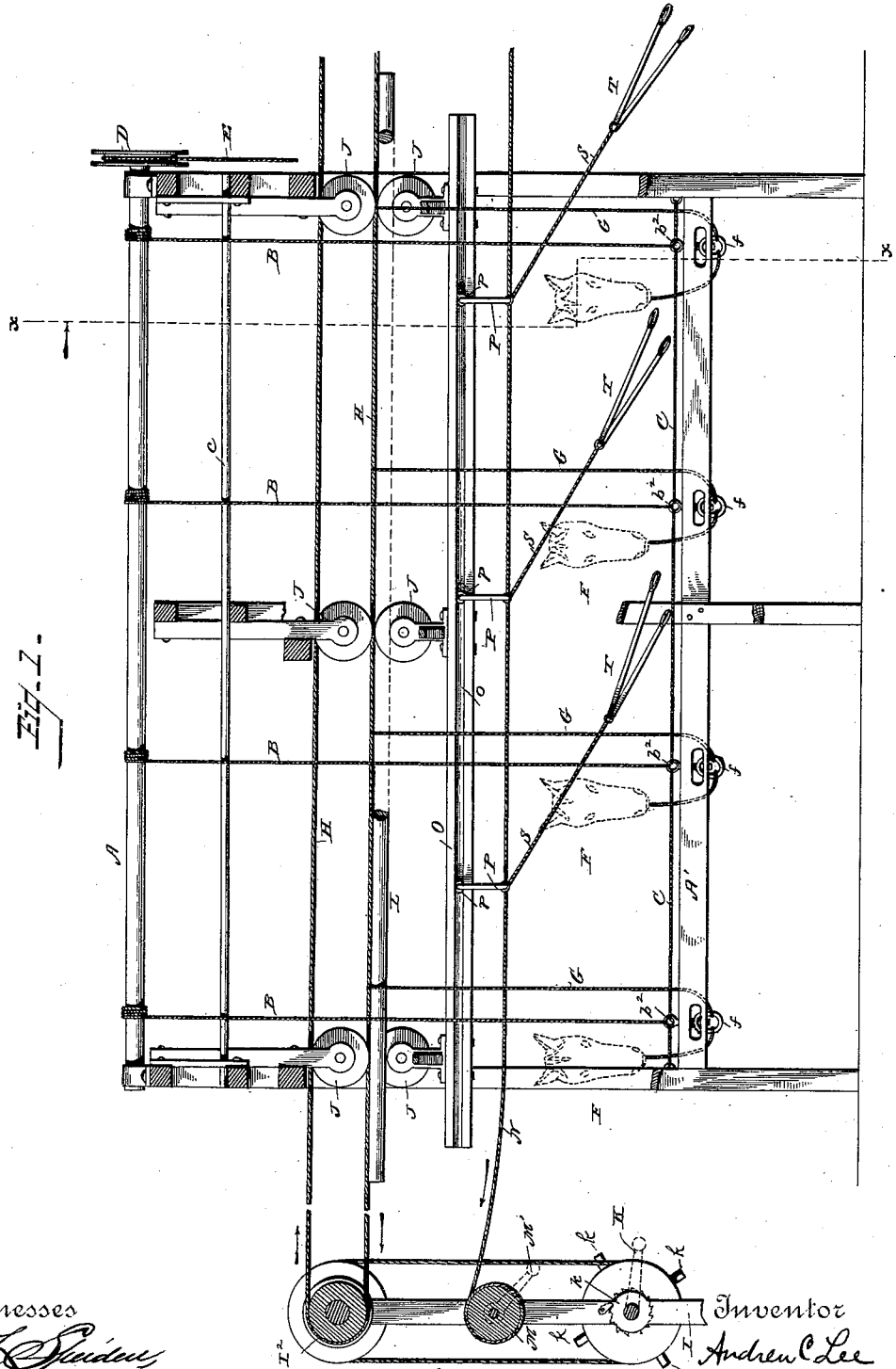

(No Model.) 2 Sheets—Sheet 2.
A. C. LEE.
DEVICE FOR RELEASING ANIMALS.
No. 352,547. Patented Nov. 16, 1886.
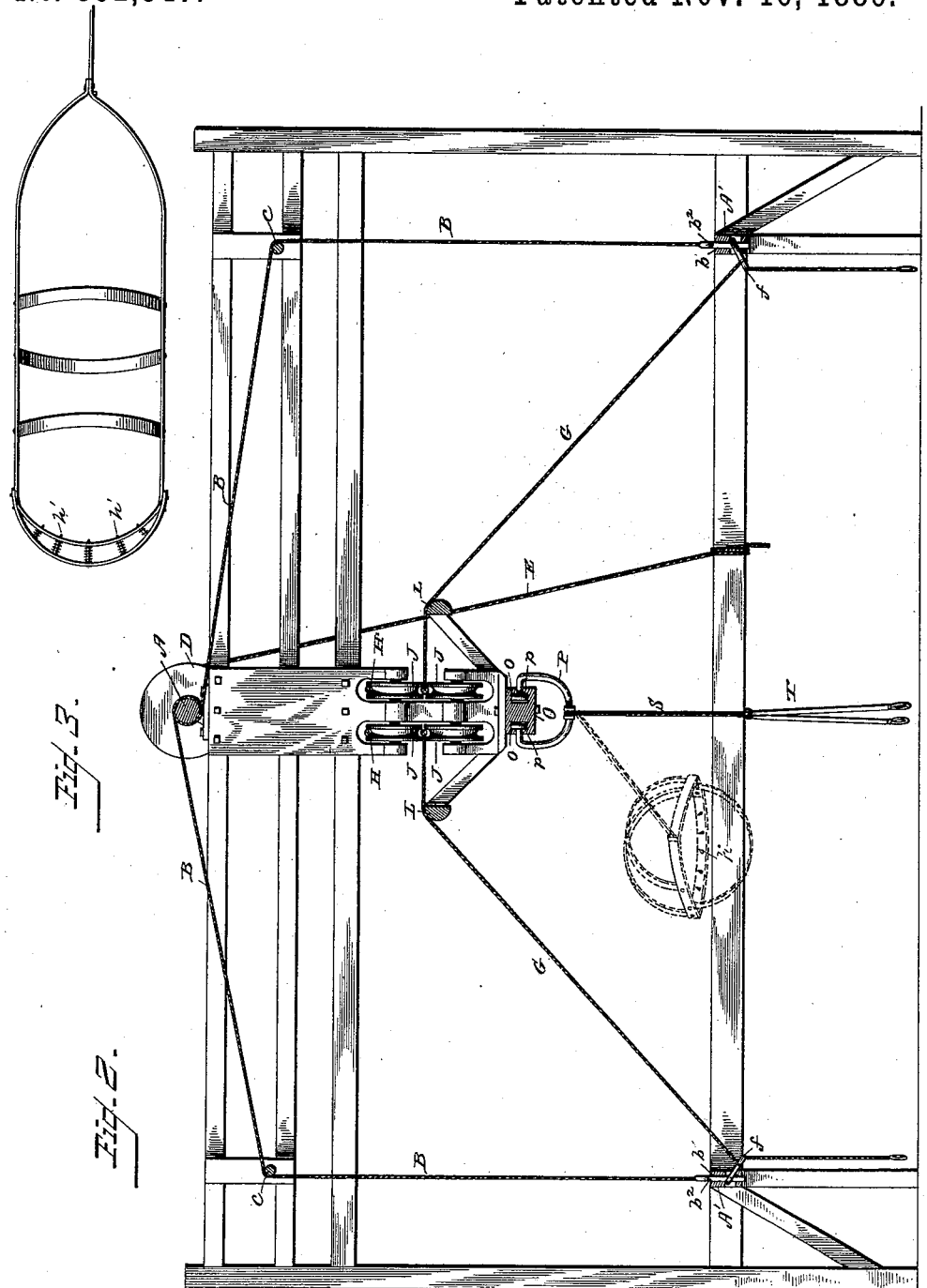
Witnesses
Inventor
Andrew C. Lee
By his Attorney

UNITED STATES PATENT OFFICE.

ANDREW CROCKETT LEE, OF GALLATIN, TENNESSEE.

DEVICE FOR RELEASING ANIMALS.

SPECIFICATION forming part of Letters Patent No. 352,547, dated November 16, 1886.

Application filed June 3, 1886. Serial No. 204,081. (No model.)

*To all whom it may concern:*

Be it known that I, ANDREW CROCKETT LEE, a citizen of the United States, residing at Gallatin, in the county of Sumner and State of Tennessee, have invented certain new and useful Improvements in Devices for Releasing Animals; and I do hereby declare the following to be a full, clear, and exact description of the invention, such as will enable others skilled in the art to which it appertains to make and use the same, reference being had to the accompanying drawings and letters of reference marked thereon, which form a part of this specification, in which—

Figure 1 is a vertical longitudinal section of a portion of a building equipped with my improved appliance. Fig. 2 is a cross-section on the line $x$ $x$ of Fig. 1. Fig. 3 is a perspective detail, more particularly hereinafter described.

The invention relates to devices for releasing animals; and the invention consists in the peculiar combinations and the novel construction, arrangement, and adaptation of parts, all as more fully hereinafter described, shown in the drawings, and particularly pointed out in the claims.

Referring by letter to the said drawings, in which is shown the preferable form of my improvement, and in which I have shown sufficient of the frame of a building to clearly illustrate the application of my improvement, A indicates a suitable shaft journaled in bearings on the frame of a building. B B are cords attached to said shaft and running in opposite directions toward the sides of the building, as shown in Fig. 2. The free ends of these cords have attached to them the pins $b$, each provided with an eye, $b^2$, and through these eyes is placed or passed, one upon each side of the building, a wire or rod, C, the ends of which are held against the frame in such a manner as to prevent accidental releasing of the animals, but yet to be readily released when power is exerted on the cords B. By means of this rod, which may be dispensed with without departing from the spirit of my invention, all of the animals on one side of the building may be simultaneously released, even if one or more of the cords should be broken.

D is a pulley attached to the shaft A, and secured to this pulley is one end of a cord, E, the other end of which passes through the side of the building to the outside thereof, where it may be secured in any convenient manner within easy reach of the operator.

The cords B are so attached to the shaft A that when said shaft is revolved all of the cords B are wound upon said shaft, for a purpose hereinafter set forth.

The animals, which are indicated by the letter F, are each provided with a halter, to one end of which is attached a ring, $f$, passed horizontally through a slot, $a$, in the timber A'. The pin $b$, attached to the cord B, passes through a vertical hole, $b'$, in said timber and through the ring $f$. G is a cord attached to said ring, with its other end attached to the endless belt H. When the shaft A is rotated, the cords B are wound thereon, withdrawing all of the pins $b$ simultaneously from engagement with the rings $f$, and thus the horses are released from the timber A'.

In order to decrease friction and to secure a vertical movement of the pins, so as to insure a positive and certain disengagement from the rings, I provide the rods $c$, which are properly journaled in the frame of the building, one upon each side thereof, directly above the vertical opening $b'$ in the timber A'.

Secured to the vertical upright I, located at any convenient distance from the building, are the wheels or pulleys I' I², around which passes the endless chain or belt I³. To the shaft of the wheel I' is secured a suitable crank, K, by which the same is rotated. Pins or handles $k$, secured to a hub or extension upon the inner side of the hub of the wheel, may be used to assist in turning the wheel, the ratchet $k'$, of ordinary construction, being provided to prevent the wheel from moving in the wrong direction. Around the upper wheel, I², passes the endless belt H, to which the cords G are attached.

The horses being released by the rotation of the shaft A in the manner above described, motion is imparted to the belt H through the medium of the crank K, wheels, and chain, and the animals are led out of the building.

J J are pulleys over which the endless belt H passes, and L L are supports for the cords G, as shown.

Supposing the vehicles to be arranged in the longitudinal center of the barn and it is desired to remove the same, I have provided for this purpose the following mechanism: Secured to the upright I is a drum, M, provided with a crank, M', and N is a belt, chain, or cord passed over said drum. The longitudinal timber O is provided upon opposite sides with grooves o, forming ways in which travel the anti-friction rollers p, secured to the free ends of the clevises P, to which clevises the cord or belt N is attached. S S are cords or straps attached one to each of said clevises, to the free ends of which straps is attached a bifurcated strap, T, the ends of which are provided with snap-hooks or other suitable clasping devices adapted to engage the cross-bar of a vehicle.

The operation of the above-described apparatus is self-evident, and a more detailed description thereof is not deemed necessary.

It is sometimes advisable to provide a means to urge the horses forward, especially in cases in which from fright they balk or hold back, and a suitable means for this purpose is shown detached in Fig. 3, consisting of a breeching device provided with spring-actuated spurs. This device can be attached to the cord N between the cords S, as shown in dotted lines in Fig. 2.

Having thus described my invention, without limiting myself to the precise construction or arrangement shown, what I claim to be new, and desire to secure by Letters Patent, is—

1. The combination, with the endless belt H and means for imparting motion to the same, of the cords G, attached at one end to said belt and at the other to the ring of the halter, substantially as described.

2. The combination, with the shaft A and cords B, attached thereto, as described, of the pins b, attached to the free ends of said cords, and provided with eyes $b^2$, and the rod C', passed through the eyes of all the pins on one side of the building, substantially as and for the purpose specified.

3. The combination, with the endless belt H, means for imparting motion to the same, pulleys J J, and cords G, attached to said belt, of the supports L for said cords, substantially as described.

In testimony whereof I affix my signature in presence of two witnesses.

ANDREW CROCKETT LEE.

Witnesses:
D. K. SPILLER,
ARTHUR D. FITZGERALD.